United States Patent [19]

Bernard et al.

[11] Patent Number: 4,686,867
[45] Date of Patent: Aug. 18, 1987

[54] BICYCLE PEDAL AND SHOE FASTENING COMBINATION

[75] Inventors: Jean Bernard, Cluses; Michel Mercier, Coulanges les Nevers, both of France

[73] Assignee: Ste Look, Nevers, France

[21] Appl. No.: 875,240

[22] Filed: Jun. 16, 1986

Related U.S. Application Data

[63] Continuation of Ser. No. 678,503, Dec. 5, 1984, abandoned.

[30] Foreign Application Priority Data

Dec. 16, 1983 [FR] France ............................ 83 20185

[51] Int. Cl.⁴ .......................... G05G 1/14; A43B 5/00
[52] U.S. Cl. .................................. 74/594.6; 36/131; 74/594.4
[58] Field of Search ................ 74/594.1, 594.2, 594.3, 74/594.4, 594.6; 36/131, 132, 117, 120, 122; 280/11.3, 11.31, 11.32, 11.33, 11.34, 613, 617-620

[56] References Cited

U.S. PATENT DOCUMENTS

| | | | |
|---|---|---|---|
| 550,409 | 11/1895 | Hanson | 74/594.6 |
| 581,181 | 4/1897 | Spencer | 36/131 |
| 3,545,415 | 12/1970 | Mori | 74/569 |
| 3,788,163 | 1/1974 | Gausse et al. | 74/594.6 |
| 4,136,211 | 1/1979 | Sliney | 427/34 |
| 4,488,453 | 12/1984 | Drugeon et al. | 74/594.6 |

FOREIGN PATENT DOCUMENTS

| | | | |
|---|---|---|---|
| 3149345 | 6/1983 | Fed. Rep. of Germany | 74/594.6 |
| 3221429 | 12/1983 | Fed. Rep. of Germany | 74/594.6 |
| 993958 | 11/1951 | France | 74/594.6 |
| 2432427 | 4/1980 | France | 36/132 |
| 2442175 | 6/1980 | France | 74/594.6 |

Primary Examiner—Gary L. Smith
Assistant Examiner—Vinh Luong
Attorney, Agent, or Firm—Young & Thompson

[57] ABSTRACT

A device for fastening a shoe on a bicycle pedal comprises a mounting support secured to the sole of the shoe and a pedal provided with a claw for retaining the mounting support. A twisting movement of the cyclist's foot permits lateral disengagement of the shoe by means of V-shaped control surfaces which are formed respectively on the mounting support and on the claw and are capable of producing a rearward withdrawal of the claw. The pedal is provided with fixed bearing stops which are so arranged as to absorb all the efforts exerted by the mounting support in a rearward direction in the course of normal pedaling, thus preventing any untimely shoe release.

6 Claims, 7 Drawing Figures

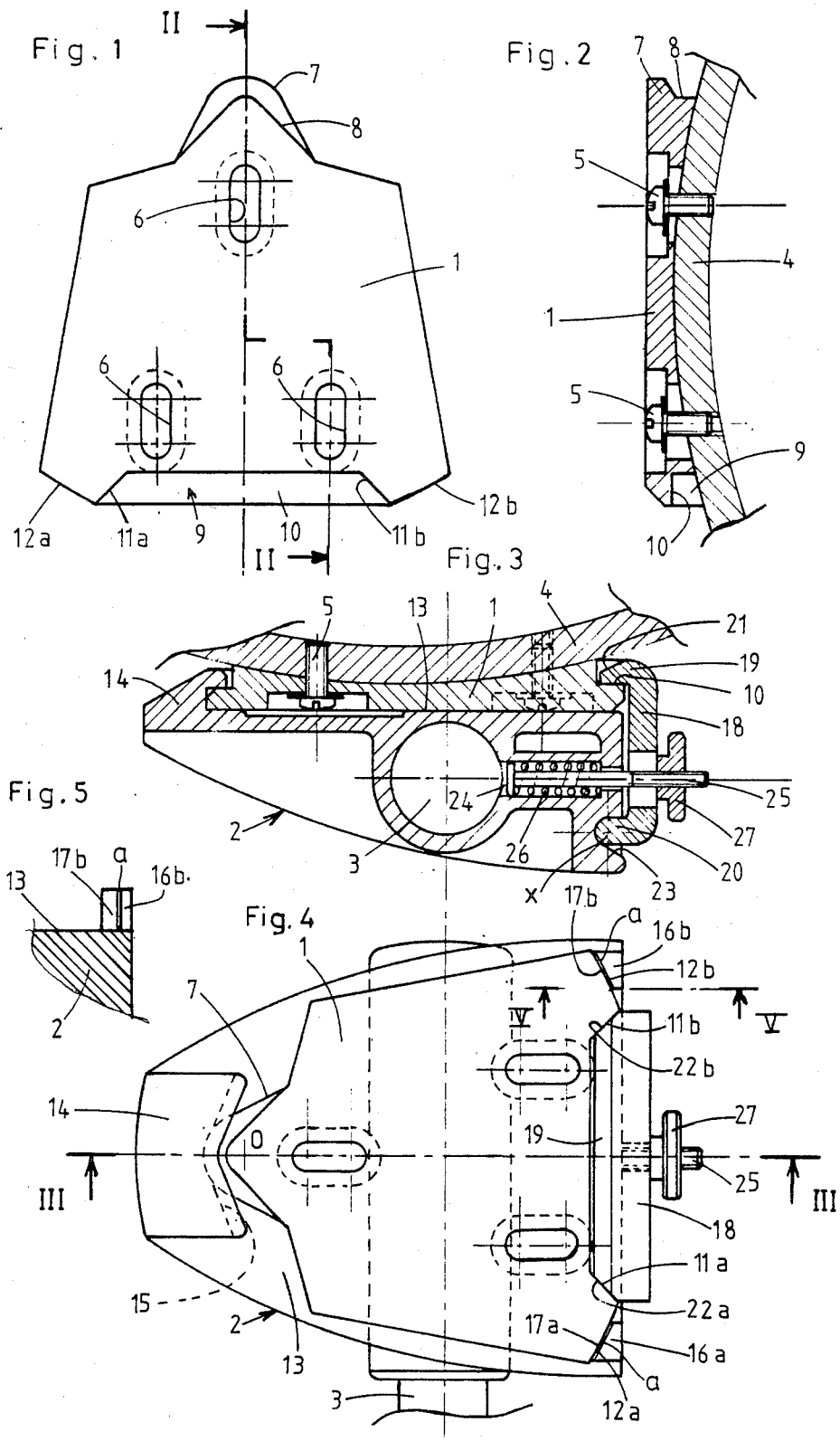

BICYCLE PEDAL AND SHOE FASTENING COMBINATION

This application is a continuation, application Ser. No. 678,503, filed 12/5/84 abandoned.

BACKGROUND OF THE INVENTION

1. Field of the Invention

The present invention relates to a device for fastening a shoe on a bicycle pedal.

2. Description of the Prior Art

In particular in patents, there have already been proposed a number of different devices of this type which permit on the one hand easy positioning of a shoe on a bicycle pedal without any manual intervention and on the other hand rapid disengagement of the shoe either at will (when the cyclist desires to place his foot on the ground) or automatically as a result of a fall.

French Pat. No. 2,422,175 relates to a device of this type in which the pedal is equipped with shoe-retaining means adapted to cooperate with a mounting support fixed to the sole of the shoe in order to maintain this latter applied on the pedal. These retaining means comprise fixed front means and movable rear means urged into their shoe-retaining position by a resilient system.

Positioning of the shoe on the pedal takes place in two stages: a forward movement of approach which brings the mounting support to a position in which it is abuttingly applied against the front retaining means and a downward movement of the heel in which the mounting support engages by snap action within the rear retaining means. Intentional disengagement is performed by means of a lateral twisting movement of the foot which initiates opening of the rear retaining means.

This device is very satisfactory from an operational standpoint. Practical tests performed on prototypes have in fact proved that positioning of the shoe on the pedal and disengagement of the shoe are two extremely easy, rapid and natural operations.

In the embodiments of FIGS. 23 to 25 and 26 of the patent cited earlier, the movable rear retaining means are constituted by a single lever pivotally mounted on a transverse horizontal shaft (which is parallel to the axis of rotation of the pedal) and actuated by a spring which is placed in a longitudinal position. The pivoted lever is provided either with a pair of claws or with a single claw adapted to cooperate with the mounting support by means of surfaces which form a V when seen from above. By means of a wedge effect, lateral displacement of the mounting support thus produces a rearward pivotal movement of the retaining lever and consequently releases the shoe.

The construction just mentioned is particularly advantageous by reason of its extreme simplicity and its low cost price which are essential requirements for large-scale manufacture and wide commercial distribution. Furthermore, the transverse arrangement of the pivotal shaft of the lever ensures free and reliable withdrawal of the retaining claw (or claws), thus permitting instantaneous release of the shoe at the time of lateral disengagement. However, this construction is subject to the following major disadvantage: while the bicycle is traveling, the efforts exerted by the mounting support on the pedal during one revolution are successively oriented in the forward, downward, rearward and upward directions. In point of fact, the rearwardly direction efforts which may be relatively violent on certain occasions (starting, climbing hills by standing up on the pedals, for example) produce direct action on the retaining lever in the direction of opening of this latter. In consequence, these efforts are liable to produce untimely disengagement of the shoe with respect to the pedal, which is clearly unacceptable from the point of view of both safety and performance.

SUMMARY OF THE INVENTION

The object of the invention is to overcome the disadvantage mentioned in the foregoing.

To this end, the device for fastening a shoe on a bicycle pedal in accordance with the invention is constituted (as in the form of construction described earlier) by a mounting support fixed beneath the sole of the shoe and by a pedal provided with retaining means adapted to maintain the mounting support normally applied on the pedal. Said retaining means comprise a claw which is mounted so as to be capable of moving in the longitudinal direction of the bicycle and is urged in the forward direction by a resilient member in order to engage on the rear portion of the mounting support. The claw and the mounting support are adapted to cooperate with each other by means of V-shaped control surfaces so arranged that a movement of rotation of the mounting support in its own plane produces a rearward displacement of the movable claw and permits lateral disengagement of the shoe. In accordance with the invention, the pedal is further provided with fixed bearing means which are so arranged as to absorb all the efforts exerted by the mounting support in a rearward direction while permitting rotation of said mounting support in its own plane.

By virtue of this arrangement, any accidental rearward disengagement of the shoe is made impossible since the movable retaining claw is not urged in this direction while normal pedaling takes place.

In accordance with a distinctive feature of the invention, the bearing means aforesaid are constituted by a pair of stops which project vertically on each side of the movable claw and are adapted to cooperate with complementary bearing faces formed at the rear end of the mounting support.

In a preferred embodiment which is illustrated in the accompanying drawings, the pedal comprises a fixed front retaining claw which is capable of retaining the central portion of the front face of the mounting support and serves as a center of rotation of said mounting support in its own plane, the bearing surfaces of the two stops and of the complementary faces of the mounting support being portions of a cylinder which is centered on the front retaining claw in order to guide the mounting support in its movement of rotation.

The fixed bearing means are advantageously provided with a surface covering having a low coefficient of friction in order to facilitate rotation of the mounting support as a result of a twisting movement of the foot.

In accordance with a further distinctive feature of the invention, engagement of the mounting support on the pedal under the action of the movable claw is carried out by means of a bearing zone which is shaped and arranged so as to ensure that an upward tractive force exerted on the mounting support does not produce a rearward displacement of the movable claw. This accordingly removes any potential danger of accidental release of the device as a result of abrupt tractive efforts of the foot in the vertical direction.

In accordance with yet another distinctive feature of the invention, the movable claw is constituted by a lever pivoted about a transverse axis. For reasons connected with production costs, this axis is advantageously a fictitious axis formed by cooperation of a bulbous appendage formed on the lever with a transverse bearing housing formed in the pedal.

Furthermore, the zone in which the movable claw bears on the mounting support is preferably a flat surface parallel to the plane of said mounting support whilst the pivotal axis of the movable claw is located beneath and in substantially vertical relation to said bearing zone. It is thus ensured that a vertical tractive force exerted by the mounting support does not produce a pivotal-motion torque in the direction of opening of the claw.

BRIEF DESCRIPTION OF THE DRAWINGS

Other features of the invention will be more apparent upon consideration of the following description and accompanying drawings, wherein:

FIG. 1 is a bottom view of the mounting support alone;

FIG. 2 is a sectional view taken along the staggered plane II—II of FIG. 1 and showing the mounting support fixed beneath the sole of a shoe;

FIG. 3 is a sectional view taken along its longitudinal plane of symmetry III—III (FIG. 4) and showing the device as a whole with the shoe in position on the pedal;

FIG. 4 is a bottom view of the mounting support in position on the pedal (assuming that the shoe has been removed in order to provide a clear and unobstructed view);

FIG. 5 shows a detail of the pedal alone, this view being taken along the plane of section V—V of FIG. 4;

DETAILED DESCRIPTION OF THE INVENTION

Figure 6:
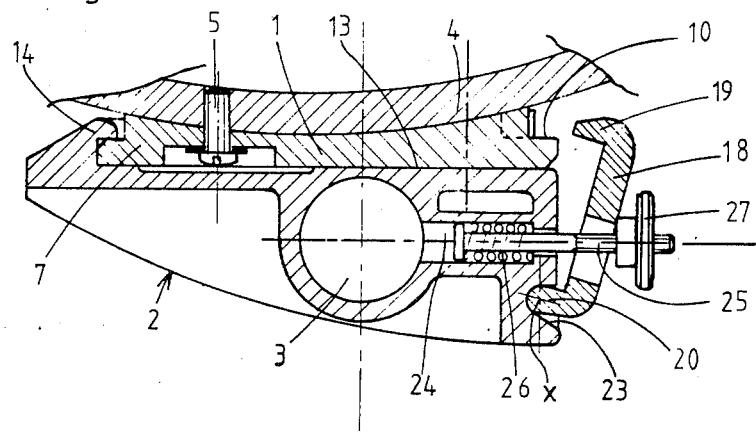
FIG. 6 is a view which is similar to FIG. 3 and shows a movement of lateral disengagement of the shoe.

The fastening device illustrated in the drawings is constituted by a mounting support 1 in the form of an approximately rectangular plate of small thickness and by a pedal 2 traversed by a pedal spindle 3 by means of which the pedal is mounted in the usual manner on the pedal crank (not shown in the drawings).

The toe end of the foot is located at the top in FIGS. 1 and 2 and at the left in FIGS. 3 to 7.

The mounting support 1 is a part of plastic material or of light alloy having a shape which is symmetrical with respect to a vertical longitudinal plane. The bottom face of the mounting support is flat and its top face is slightly concave in order to conform substantially to the portion 4 of the sole of the shoe, namely the portion located at the level of the metatarsus. Said mounting support is attached to this region of the sole by means of three sunk-head screws 5 passed through elongated slots 6 which permit adjustment of the mounting support in the longitudinal direction.

The front central portion of the mounting support 1 has the shape of a rounded nose 7, the top portion 8 of which is set-back with respect to its edge. A transverse recess 9 of substantial width is formed in the rear edge of the mounting support 1. The bottom 10 of said recess is a plane surface parallel to the underface of the mounting support. The recess 9 does not have lateral openings but is delimited on each side by an oblique vertical wall 11a, 11b. These walls form a V having a forwardly directed point. On each side of the recess 9, the rear edge of the mounting support 1 has the shape of a portion of cylinder 12a, 12b having a vertical axis centered on the center of curvature "0" of the nose 7.

The pedal 2 has a flat top face 13, the dimensions of which are slightly larger than those of the mounting support 1. The front central portion of said pedal is provided with a fixed claw 14 which projects to a slight extent above the face 13 and has a recessed concave retaining cup 15 having the shape of a V which opens-out towards the rear and having an arcuate bottom portion which is complementary to the nose 7 of the mounting support. The rear portion of the pedal is provided with a pair of lateral stops 16a, 16b which project above the face 13. The front walls of said stops are concave cylindrical portions 17a, 17b which are complementary to the portions 12a, 12b. The stops 16a, 16b are provided with a surface covering a having a low coefficient of friction such as polytetrafluoroethylene, for example.

On the rear side of the pedal 2 is mounted a retaining claw 18 in the form of a lever of substantial width and so shaped as to have at its upper end a forwardlybent nose 19 and at its lower end a bulbous appendage 20 which is also forwardly directed. It will be noted that the top edge of the nose 19 has a chamfer 21 whose function will be explained later and two side walls 22a, 22b which are complementary to the walls 11a, 11b of the recess 9. In the bottom portion of the rear face of the pedal 2 is formed a transverse concave housing 23 which is adapted to receive the appendage 20 of the lever 18.

The pedal 2 is pierced behind the spindle 3 by a bore 24 disposed longitudinally at the same height as said spindle 3. Within said bore is slidably mounted a screw 25, the head of which is urged in the forward direction by a helical compression spring 26 housed within the bore 24. The threaded end of the screw 25 passes through suitable openings formed in the rear face of the pedal 2 and in the central portion of the lever 18 so as to project rearwardly of said lever. A knurled nut 27 screwed on said threaded portion transmits to the lever 18 the force applied by the spring 26 which tends to cause a forward pivotal displacement of said lever about a fictitious transverse axis x constituted by the center of rolling motion of the appendage 20 within the housing 23. By screwing the nut 27 to a greater or lesser extent, it is possible to vary the degree of compression of the spring 26 and consequently the intensity of said applied force.

It is worthy of note that the masses of all the components of the pedal 2 are chosen and distributed so as to ensure that the flat top face 13 is directed upwards and is slightly inclined with respect to the horizontal, the fixed claw 14 being located at a higher level than the rear portion which carries the movable claw 18.

The device is employed and operates as follows:

In order to engage his foot in the device, the cyclist presents his foot in an approximately horizontal position and moves it forward until the nose 7 is abuttingly applied against the claw 14. This operation is performed with great ease by reason of the initial natural inclination of the pedal under the action of gravity. A continued forward movement of the foot has the effect of centering the mounting support in the longitudinal axis of the pedal (by virtue of the concave V-shape of the cup 15) and of lifting the rear side of the pedal. The cyclist then applies a light pressure with his heel so that the rear edge (advantageously chamfered) of the mounting support 1 produces action on the chamfer 21 of the claw 18 and opens this latter. As soon as the mounting support 1 is applied against the top face 13 of the pedal, the claw 18 closes and the retaining nose 19 is housed within the recess 9.

While normal pedaling takes place, the efforts of the foot are transmitted to the pedal by means of the mounting support 1. Forwardly directed forces are absorbed by the fixed claw 14. Downwardly directed forces are absorbed by the top face 13 of the pedal. Rearwardly directed forces are absorbed by the bearing stops 16a, 16b. Upwardly directed forces are absorbed by the fixed front claw 14 and by the nose 19 of the movable rear claw 18. Since the zone 10 of contact of the mounting support with the nose 19 is horizontal and located substantially in vertically opposite relation to the center of curvature of the appendage 20, this vertical tractive force does not produce any opening torque on the lever 18. It is consequently found that no force applied under normal pedaling conditions is liable to cause accidental opening of the shoe-retaining lever.

Figure 7:
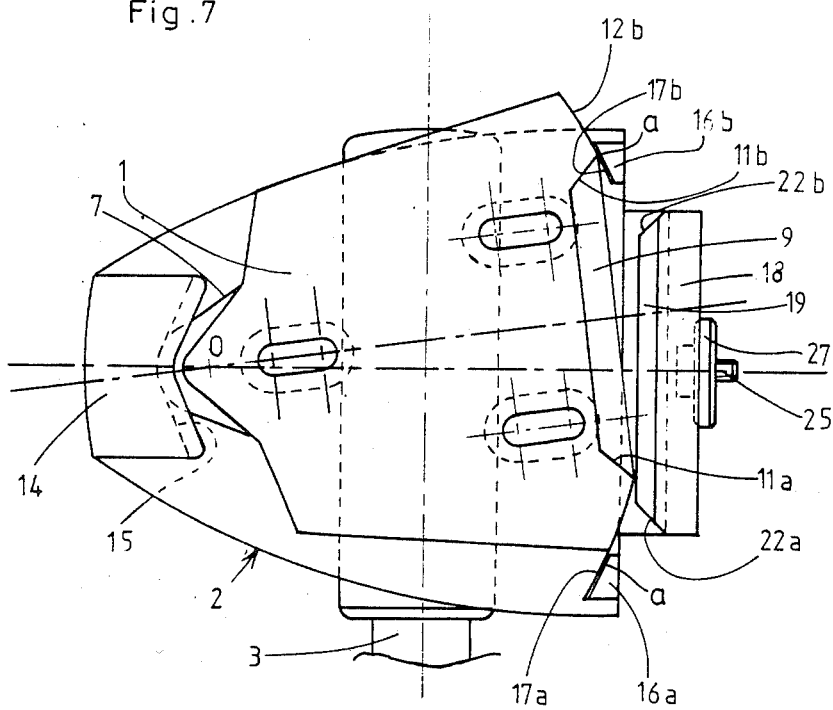
FIG. 7 is a view which is similar to FIG. 4 and shows the same lateral disengagement.

Removal of a shoe from the pedal is performed by a twisting movement of the foot, either intentionally when the cyclist desires to stop or during a fall when abnormal lateral forces develop between the mounting support and the pedal. FIGS. 6 and 7 illustrate a movement of outward disengagement of the foot.

In order to disengage each shoe, the cyclist exerts a lateral thrust with his heel. The mounting support then pivots in its own plane about the point 0 whilst the nose 7 rolls in the bottom of the cup 15 of the front claw 14. This movement of rotation is guided by the lateral stops 16a, 16b, the cylindrical bearing surfaces 17a, 17b of which cooperate with the complementary surfaces 12a, 12b of the mounting support. The anti-friction material a which covers the surfaces 17a, 17b facilitates this movement.

Rotational displacement of the mounting support is possible by reason of the inclination of the internal wall 11a of the recess 9 which exerts a thrust on the associated wall 22a of the lever 18 by wedge effect. Said lever undergoes a rearward pivotal displacement about its bulbous appendage 20 while compressing the spring 26 by means of the screw 25. The retaining nose 19 moves away from the recess 9 of the mounting support which is therefore free to escape.

In an inward twisting movement, the shoe disengagement process is identical and takes place in this instance by cooperation of the external control surfaces 11b–22b.

The force required for retaining the shoe on the pedal can be adapted to the cyclist's physical strength or to the cyclist's pedaling style by operating the knurled nut 27.

It is apparent that the device hereinabove described is extremely reliable and easy to use while being of very simple design and inexpensive to produce.

As will be readily understood, a number of different alternative forms of construction may be adopted without thereby departing either from the scope or the spirit of the invention.

Thus it follows from the foregoing that the bearing means for absorbing the rearward efforts on the mounting support could be constituted by a simple vertical cylindrical stud placed vertically opposite to the center of rotation of the mounting support and capable of engaging within a hole of the same diameter formed in the mounting support. This hole would have a flared-out opening in order to permit pivotal displacement of the mounting support with respect to the pedal at the time of positioning and disengagement of the shoe.

It would also be conceivable to provide a stud placed behind the center of rotation of the mounting support. In this case the stud would engage within an arcuate slot formed beneath the mounting support and centered on said center of rotation.

What is claimed is:

1. The combination of a shoe sole, a bicycle pedal having a front and rear end and a top face, and a device for fastening the shoe sole to the pedal, said device comprising a mounting support fixed to the shoe sole, the pedal comprising retaining means retaining said mounting support on said pedal, said retaining means comprising a claw which is mounted on said rear end of said pedal movably in the longitudinal direction of the bicycle and is urged in the forward direction by a resilient member in order to engage a rear portion of said mounting support, all portions of the mounting support being in front of the claw, said claw and said mounting support having interengaging control surfaces shaped in such a manner as to ensure that a movement of rotation of the mounting support in its own plane produces a rearward displacement of the movable claw and permits lateral disengagement of the shoe sole, wherein the pedal comprises fixed bearing means cooperating with said rear portion of said mounting support to restrict any displacement of said mounting support relative to said pedal in a rearward direction while permitting rotation of said mounting support in its own plane, said bearing means comprising a pair of stops which project upwardly from said top face of the pedal on opposite lateral sides of the movable claw and engage with bearing faces of complementary shape formed at said rear end of the mounting support, the pedal having a fixed front retaining claw which retains a laterally central portion of said front of the mounting support and defines a center of rotation for said mounting support when it rotates in its own plane, said bearing faces being portions of a cylinder which is centered on said center of rotation.

2. A fastening device according to claim 1, wherein the fixed bearing means are provided with a surface covering having a low coefficient of friction.

3. A fastening device according to claim 1, wherein the mounting support comprises a contact zone cooperating with said movable claw which contact zone is shaped and arranged so as to ensure that an upward tractive force exerted on the mounting support does not produce any rearward displacement of the movable claw.

4. A fastening device according to claim 3, wherein the movable claw is constituted by a lever provided with a retaining nose and pivoted about a transverse axis.

5. A fastening device according to claim 4, wherein said lever swings about a horizontal axis of rotation which is a fictitious axis obtained by cooperation of a bulbous appendage formed on the lever with a transverse concave bearing housing formed in the pedal.

6. A fastening device according to claim 5, wherein the said contact zone in which the movable claw bears on the mounting support is a flat surface parallel to the bottom face of the mounting support and wherein said axis of rotation of the movable claw is located beneath and in substantially vertical relation to said bearing zone.

* * * * *